United States Patent [19]

Marten et al.

[11] 3,718,036
[45] Feb. 27, 1973

[54] VEHICLE TESTING APPARATUS

[75] Inventors: John Anthony Marten, Holt; Bernard Arthur Gee, Marham, both of England

[73] Assignee: Suntester Limited, Norfolk, England

[22] Filed: March 29, 1971

[21] Appl. No.: 128,995

[30] Foreign Application Priority Data

March 31, 1970 Great Britain.....................15,225/70

[52] U.S. Cl.......................................73/117, 73/134
[51] Int. Cl....................................................G01l 5/13
[58] Field of Search................................73/117, 134

[56] References Cited

UNITED STATES PATENTS 2,982,128  5/1961  Gibson et al. ..........................73/117

3,554,022  1/1971  Geul........................................73/117

Primary Examiner—Jerry W. Myracle
Attorney—Molinare, Allegretti, Newitt & Witcoff

[57] ABSTRACT

The disclosure describes a chassis dynamometer provided with control means which may be activated so as to maintain the acceleration of the dynamometer rollers at a predetermined constant positive or negative value. Means are provided to multiply the braking torque absorbed by the dynamometer by the speed of rotation of the idle roller and to add to the product a signal proportional to the speed of rotation of the rollers so as to maintain a signal substantially proportional to the traction power output of the vehicle being tested while accelerating or decelerating at the predetermined constant value.

7 Claims, 3 Drawing Figures

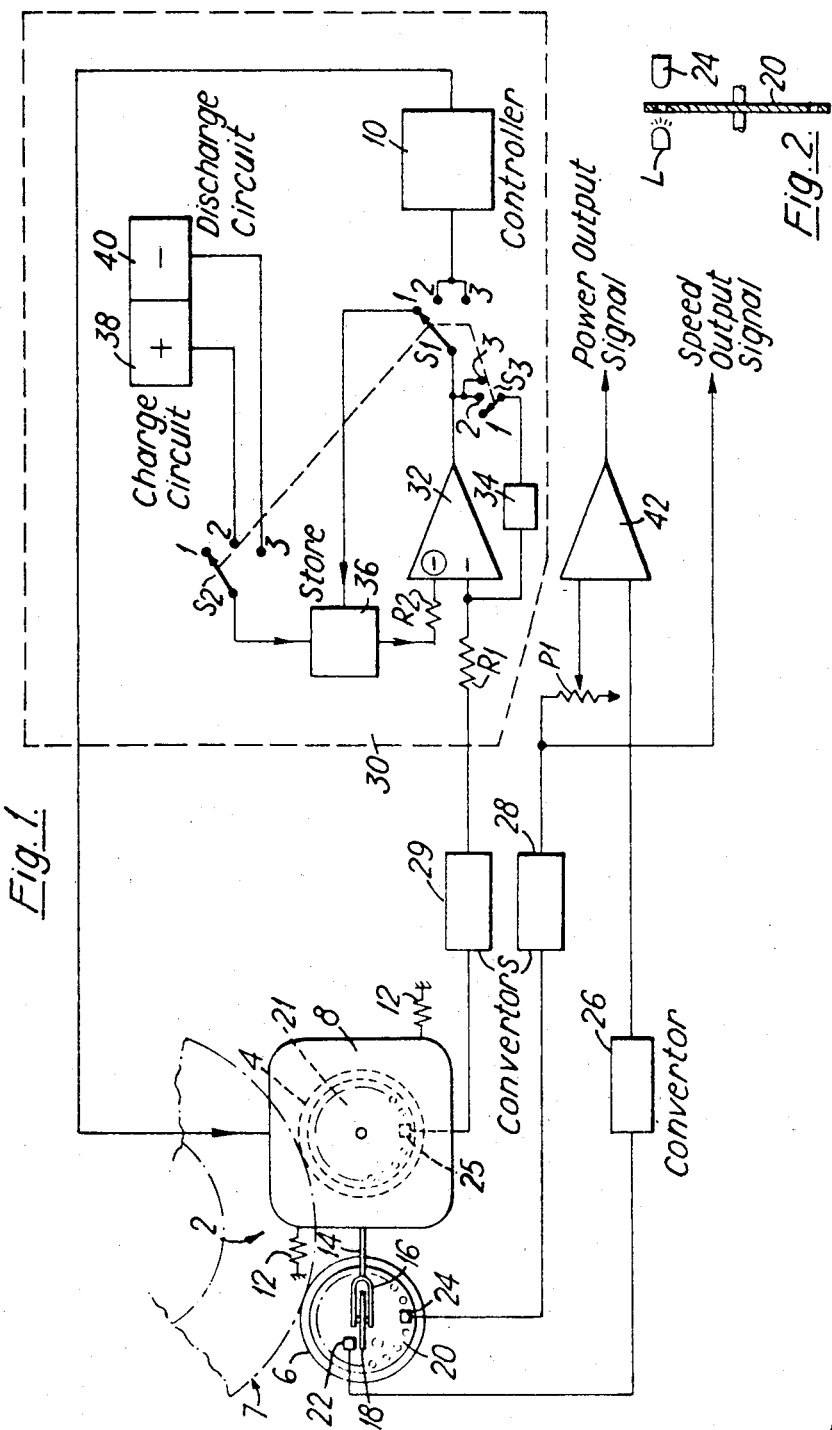

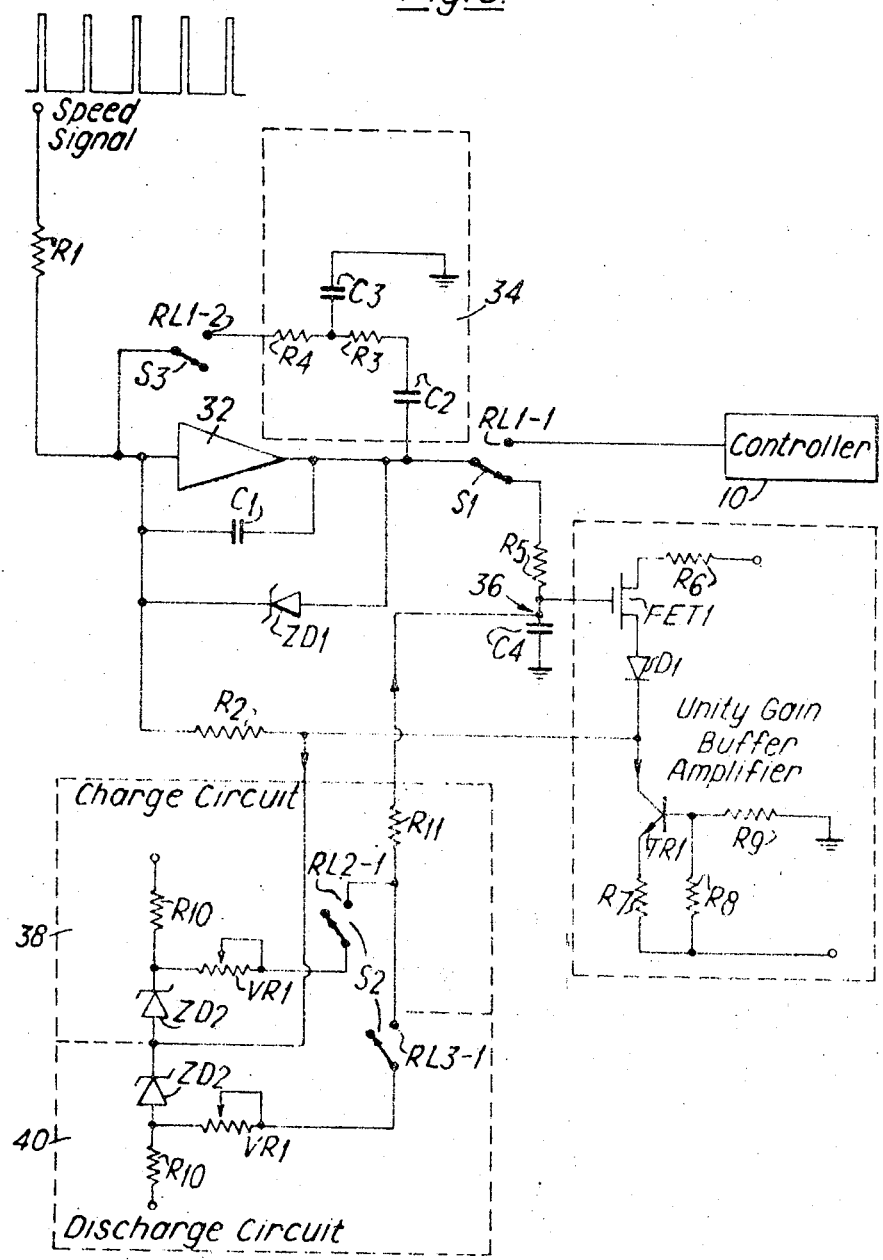

VEHICLE TESTING APPARATUS

RELATED APPLICATION

Applicants hereby claim priority under 35 U.S.C. Sec. 119 based on British application No. 15225/70, filed Mar. 31, 1970 in Great Britain by their legal assignee, Suntester Limited, a British Company of Old Meadow Road, Harwick Industrial Estate, Kings Lynn, Norfolk.

BACKGROUND OF THE INVENTION

This invention relates to motor vehicle testing apparatus and is particularly concerned with chassis dynamometers.

Chassis dynamometers are usually used to measure the tractive effort or power of motor driven road vehicles and have at least one roller or preferably at least one pair of spaced parallel rollers for driving engagement with at least one traction wheel of a motor vehicle. Braking torque is applied to the roller or to at least one roller of each pair of rollers by means, for example, of an eddy current brake. In order to measure the power absorbed by the dynamometer, which is substantially equal to the power output of a vehicle being tested, it has in the past been necessary manually to carefully balance the torque absorbed by the dynamometer against the torque of the engine so that no acceleration takes place and then to read meters indicating the speed and power output of the engine. This process is time consuming and requires a considerable degree of skill on the part of the operator. The need to balance the engine torque against the torque absorbed by the chassis dynamometer arises from the fact that if acceleration is allowed to take place, some of the engine's torque is used in accelerating the inertia of the dynamometer when the acceleration is positive, or on the other hand, when the acceleration is negative, the torque taken in decelerating the inertia of the dynamometer aids the vehicle's engine. In either case, the acceleration leads to a false reading of the engine power.

SUMMARY OF THE INVENTION

The invention is preferably used in connection with a motor vehicle testing system including a chassis dynamometer having rollers that are moved by a source of power, such as a motor vehicle. The disadvantages of the prior art may be overcome by combining with such a system a braking-power signal generating means for generating a braking-power signal dependent on the braking-power absorbed by the dynamometer, acceleration-power signal generating means for generating an acceleration-power signal depending on the product of the acceleration of the dynamometer's rollers and the speed of rotation of the rollers, and means for summing the braking-power signal and acceleration-power signal so as to derive a signal dependent on the power absorbed by the dynamometer.

It will be appreciated that the output signal more accurately represents the power generated by the vehicle's engine during transient conditions and neglects only friction and windage losses in the dynamometer. It will thus be appreciated that since time need not be taken up in manually balancing the vehicle's engine torque against the torque developed by the chassis dynamometer considerable time can be saved in testing a vehicle particularly when the test is over the full speed range of the vehicle's engine.

According to another feature of the invention, the testing apparatus includes means for controlling the braking torque developed by the dynamometer so as to maintain its acceleration at a predetermined constant positive or negative value. In this case it will be appreciated that the acceleration-power signal (dependent on the product of the acceleration of the dynamometer's rollers and the speed of rotation of the rollers) is dependent only on the speed of rotation of the rollers. This feature leads to great simplicity in the design and manufacture of the apparatus.

According to another feature of the invention, a ramp signal is generated by charging or discharging a store. A speed signal proportional to the speed of rotation of the rollers is then compared with the ramp signal and any error between the two signals determines a corrective change in the torque generated by the dynamometer. The apparatus preferably includes switch means which may be manually operated in order to isolate the error signal from controlling the torque developed by the dynamometer and to charge the store in accordance with the speed signal. In this case it will be appreciated that the vehicle may be run up to any speed under manual control and if the switch is then operated to connect to the error signal so as to control the torque developed by the eddy current brake, there is no substantial initial error signal.

It will be appreciated that while controlled automatically to accelerate or decelerate at constant rate, the power output signal and the speed signal may be conveniently applied to the Y and X input respectively of an XY plotter so that a graph of power against speed for the engine over the range of engines speed is automatically produced. Alternatively, the power signal and the speed signal may be fed to counters or printers which may be operated at predetermined intervals of power, speed or time.

DESCRIPTION OF THE DRAWINGS

These and other advantages and features of the present invention will hereafter appear for purposes of illustration, but not of limitation, in connection with the accompanying drawings wherein like numbers refer to like parts throughout and wherein:

FIG. 1 is a schematic circuit diagram of vehicle testing apparatus made according to a preferred embodiment of the invention;

FIG. 2 is an enlarged, fragmentary, cross-sectional view of a portion of the apparatus shown in FIG. 1; and FIG. 3 is a more detailed schematic circuit diagram of part of the circuit of FIG. 1.

DESCRIPTION OF THE PREFERRED EMBODIMENT

As may be seen from the drawings, the vehicle testing apparatus includes a chassis dynamometer, indicated schematically at 2, having two rollers 4 and 6 each for driving engagement with the traction wheels (indicated in phantom outline at 7) of the motor vehicle to be tested. The roller 4 is coupled to the rotor of an eddy current brake 8, the braking torque of which depends upon the power output from a controller 10, the stator of the brake 8 is mounted for pivotal movement about the axis of its rotor against the bias of springs 12. Any braking torque developed by the eddy current brake 8 causes its stator to pivot about its axis until the torque is balanced by the springs 12. The amount of pivotal movement against the bias of springs 12 is dependent on the braking torque developed by the eddy current brake. Fixedly mounted on the stator of the eddy current brake is an arm 14 having a forked outer end 16, within which fork a perforated disc 18 is freely rotatably mounted. The perforations of the disc are equally spaced around a circle which is substantially concentric with the axis of rotation of the disc. The edge of the disc 18 is in driving contact with another similar perforated disc 20 which is fixedly mounted in relation to and for rotation with the idling roller 6. The speed of rotation of the disc 16 depends on the product of the speed of rotation of the roller 6 and on the displacement of the disc 18 from the center of rotation of the disc 20 and thus on the product of the speed of rotation of the vehicle's wheels and the braking torque developed by the dynamometer which product is equal to the traction power output of the vehicle (i.e., the braking power absorbed by the dynamometer). FIG. 2 shows a cross-section of the disc 20. A photo-sensitive device 22, 24 is mounted on one side of each of the discs 18 and 20 respectively and a respective lamp L is mounted on the opposite side of each disc so that light from the lamp is incident on its respective photo-sensitive device 22 or 24 when each of the holes in the disc passes. The photo-sensitive device 22 produces a braking-power pulse output signal whose frequence is proportional to the speed of rotation of the disc 18 and thus to the traction power output of the vehicle or the braking power absorbed by the dynamometer. The photo-sensitive device 24 produces an acceleration-power pulse output signal whose frequency is dependent on the speed of rotation of the disc 20 and thus on the speed of rotation of the vehicle wheels 7. This apparatus is more fully described in our copending application Ser. No. 124,402 entitled, "Improvements In And Relating To Vehicle Testing Apparatus," filed Mar. 15, 1971.

The pulse output signals from the photo-sensitive devices 22 and 24 are converted to analogue signals by converters 26 and 28 respectively.

Fixedly mounted in relation to and for rotation with the braked roller 4 is another perforated disc 21 which has a similar lamp L and photo-sensitive device 25, the output frequency of which is proportional to the speed of rotation of the roller 4. This may not be quite the same as the speed of rotation of the idle roller 6 due to slippage between the tire and the roller 4. Further, on occasions during tests the vehicle's wheels can drive off of the roller 6 for short periods.

The frequency output signal of the photo-sensitive device 25 is fed to a converter 29 such as a pulse squarer, the leading edge of the pulses triggering a mono-stable circuit which produces an output pulse of fixed duration for each input pulse so that the average output signal is proportional to the speed of rotation of the roller 4.

The analogue speed signal from the converter 29 is fed to an input of a control circuit 30 for controlling the braking torque developed by the eddy current brake 8.

The input comprises a resistor $R_1$ connected to an inverting input of a high gain amplifier 32 and is connected to the output of the amplifier by a negative feed back network 34 via a switch $S_3$. The network 34 comprises a serially connected capacitor and resistor. These components are so chosen that at low frequencies the amplifier and feed back network act as an integrator and so as to provide optimum stability and response of the apparatus. In the case where the converter 29 is a mono-stable circuit, the network 34 also acts as a smoothing circuit.

The output from a store 36 is fed via a resistor $R_2$ to an inverting input of the amplifier 32. The output from the amplifier 32 is fed via a switch $S_1$ of the three ganged switches $S_1$, $S_2$, $S_3$ to an input to the store when the switches are in their position 1, or alternatively to an input to the controller 10 when the switches are in their positions 2 or 3. In the second case the eddy current brake 8 is controlled so as to produce such a braking torque as to reduce any error between the signals at its two inverting inputs to zero: that is, to control the speed of rotation of the rollers to correspond to the output signal from the store. This is achieved by the production of an error signal from amplifier 32 when there is a difference between the signals at the input to the amplifier. Since the feed back network 34 is then connected and since the amplifier 32 and feed back network 34 act together as an integrator, there is no substantial steady state error between the output signal from the store and the corresponding speed signal.

When the switches are in their position 1 (as shown in the drawing) the feed back network 34 is disconnected and the only input to the store is the output from the amplifier 32: the stored signal is, therefore, constantly charged to a value corresponding to the speed of rotation of the braked roller 4 of the dynamometer. If when the dynamometer is running the switches are moved to their position 2 a charge circuit 38 is connected to the store which is disconnected from the output of the amplifier 32. The charge circuit 38 acts to charge the store so as to increase the magnitude of its stored signal at a constant rate in order to generate a ramp signal. The output of the store, therefore, increases at a constant rate and, as explained above, the braking torque developed by the eddy current brake 8 is controlled so as to allow the vehicle being tested to accelerate the rollers of the dynamometer at a corresponding constant rate. When the switches are turned to their position 3 the only input to the store is a discharge circuit 40 which decreases the signal stored at a linear rate so that the output of the store decreases at a constant rate and, as explained above, so controls the braking torque developed by the eddy current brake 8 as to cause the braked roller 4 of the dynamometer to decelerate at a constant rate.

The store 36 may conveniently comprise a capacitor and a buffer output circuit, the capacitor being negatively charged by the output from the amplifier 32 or the charge circuit 38, or discharged by the discharge circuit 40 according to the position of the ganged switches $S_1$, $S_2$.

As is shown in the drawing, the output signal from the converter 26 and a portion of the output signal from the converter 28, transmitted by potentiometer P1 are summed by a summing amplifier 42 to provide a power output signal which, while the dynamometer is so controlled as to be accelerating or decelerating at constant rate, is substantially equal to the traction power output of the vehicle being tested. The speed output signal from the converter 28 and the power output signal from the amplifier 42 may be fed to respective meters. However, we prefer to feed the signals to the X and Y inputs respectively of an XY plotter which thus enables a power/speed curve for the engine of a vehicle to be quickly and easily plotted.

The converters 26 and 28 may conveniently also comprise a pulse squarer, the leading edge of each output pulse of which is arranged to trigger a mono-stable circuit so as to provide an output pulse of fixed duration and fixed magnitude for each input pulse from the respective photo-sensitive device 22 or 24. The average value of the output signal from the mono-stable circuits then corresponds to the braking power developed by the eddy current brake 8 and the speed of rotation of the rollers 4 and 6 respectively.

The power output signal and speed output signal may then be read by respective meters which are sensitive to the average value of the signal. However, particular in the case where an XY plotter is used to produce the power/speed graph it may be preferred to include in each of the converters 26 and 28 a smoothing circuit so arranged to produce an output signal which corresponds to the average value of the output signals of the two mono-stable circuits.

The control circuit 30 is shown in more detail in FIG. 3. As is shown the high-gain amplifier 32 has a feed back capacitor $C_1$ of relatively small value, the purpose of which is to smooth the output signal of the amplifier so that it comprises substantially the average value of the pulse speed input signal. The amplifier also has a zener diode $ZD_1$ connected between its input and output so as to limit its output voltage to a maximum value. The feed back network 34 will be seen to comprise a capacitor $C_2$ which has a relatively large value in series with two resistors $R_3$ and $R_4$ whose junction is connected by a capacitor $C_3$ to earth. The switches $S_1$, $S_2$ and $S_3$ are replaced by relay contacts $RL_{1-1}$, $RL_{1-2}$, $RL_{2-1}$, and $RL_{3-1}$ so that the switches may be operated remotely, for example, from within the car being tested. When contact $RL_{1-2}$ is made, the feed back network 34 acts as an integrator at low frequencies, at higher frequencies the gain is determined by resistors $R_3$ and $R_4$ and at still higher frequencies the feed back is progressively removed by the capacitor $C_3$ providing phase advance at higher frequencies.

The store 36 comprises a serially connected capacitor $C_4$ and resistor $R_5$ which are connected between one of the $RL_{1-1}$ contacts and earth. The junction between the resistor $R_5$ and capacitor $C_4$ connected to the gate of field transistor $FET_1$. The field effect transistor $FET_1$ has a drain resistor $R_6$ and its source is connected via a diode $D_1$ to the collector of a transistor $TR_1$ which is so biased by means of resistors $R_7$, $R_8$ and $R_9$ as to limit the current through the field effect transistor to a substantially constant value. The field effect transistor has a high gate input impedance and there is negligible drain on the capacitor $C_4$. The junction between the diode $D_1$ and the transistor $TR_1$ is connected to the resistor $R_2$.

The charge and discharge circuits 38 and 40 comprise a resistor $R_{10}$ and zener diode $ZD_2$ which are connected between the output from the unity gain buffer amplifier and a positive or negative supply voltage respectively the junction between each of the resistors $R_{10}$ and the zener diode $ZD_2$ is connected via a relatively large value variable resistor $VR_1$ each of which may be alternatively connected by $RL_{2-1}$ or $RL_{3-1}$ respectively and via a resistor $R_{11}$ to charge the capacitor $C_4$. It will be appreciated that the charge and discharge circuits develop respectively positive or negative voltages of fixed predetermined value with respect to the voltage stored on the capacitor $C_4$ thus providing a constant charging current so that the capacitor $C_4$ charges or discharges at a constant rate depending on which of the two contacts $RL_{2-1}$ or $RL_{3-1}$ is closed.

If neither contact $RL_{2-1}$ or $RL_{3-1}$ is closed and contact $RL_{1-2}$ is closed and contact $RL_{1-1}$ connects the output of the amplifier 32 to the controller 10, the torque developed by the eddy current brake is so controlled as to maintain the speed of rotation of the dynamometer's rollers at a speed corresponding to the output signal of the store 36, i.e., to the voltage stored on capacitor $C_4$.

When the contacts $RL_{1-1}$, $RL_{1-2}$, $RL_{2-1}$ and $RL_{3-1}$ are all in the positions shown in FIG. 3, the torque developed by the eddy current brake 8 is zero and the voltage stored in capacitor $C_4$ is maintained at a value equal to the output of the amplifier 32 and hence proportional to the average value of the pulse speed signal.

Those skilled in the art will recognize that the preferred embodiment described herein may be altered and modified without departing from the spirit and scope of the invention as defined in the appended claims.

We claim:

1. In a motor vehicle testing system including a chassis dynamometer having rollers that are moved by a source of power, improved apparatus for measuring the power produced by the source comprising:
   brake means for applying a predetermined amount of torque to at least one of the rollers;
   braking-power signal generating means for generating a braking-power signal dependent on the braking-power absorbed by the dynamometer;
   acceleration-power signal generating means for generating an acceleration-power signal dependent on the power required to accelerate the dynamometer rollers;
   means for summing the braking-power signal and acceleration-power signal so as to derive a signal dependent on the power absorbed by the dynamometer; and
   control means connected to the brake means for controlling the braking torque developed by the brake means so as to maintain the dynamometer acceleration at a predetermined positive or negative value.

2. Apparatus, as claimed in claim 1, wherein the acceleration-power signal generating means comprise means for generating a speed signal dependent on the speed of rotation of the dynamometer rollers, and means for transmitting a portion of the speed signal to the means for summing.

3. Apparatus, as claimed in claim 2, wherein the control means comprise generator means for generating a ramp signal and speed control means connected between the generator means and the brake means for controlling the speed of rotation of the dynamometer rollers in proportion to the ramp signal.

4. Apparatus, as claimed in claim 3, wherein the generator means comprises a store which may be selectively charged or discharged at a constant rate and wherein the speed control means further comprises means for comparing a velocity signal proportional to the speed of rotation of the dynamometer rollers with the ramp signal so that any error between the velocity signal and ramp signal produces an error signal that results in a corrective change in the torque generated by the brake means.

5. Apparatus, as claimed in claim 4, and further comprising switch means connected between the speed control means and the store, and means for manually operating the switch means in order to isolate the error signal from controlling the torque developed by the brake means and to charge the store in accordance with the speed signal.

6. Apparatus, as claimed in claim 2, wherein the control means comprises means for controlling the braking torque developed by the brake means so as to maintain the dynamometer acceleration at a predetermined constant positive or negative value.

7. Apparatus, as claimed in claim 6, wherein the means for transmitting comprises a potentiometer.

* * * * *